UNITED STATES PATENT OFFICE.

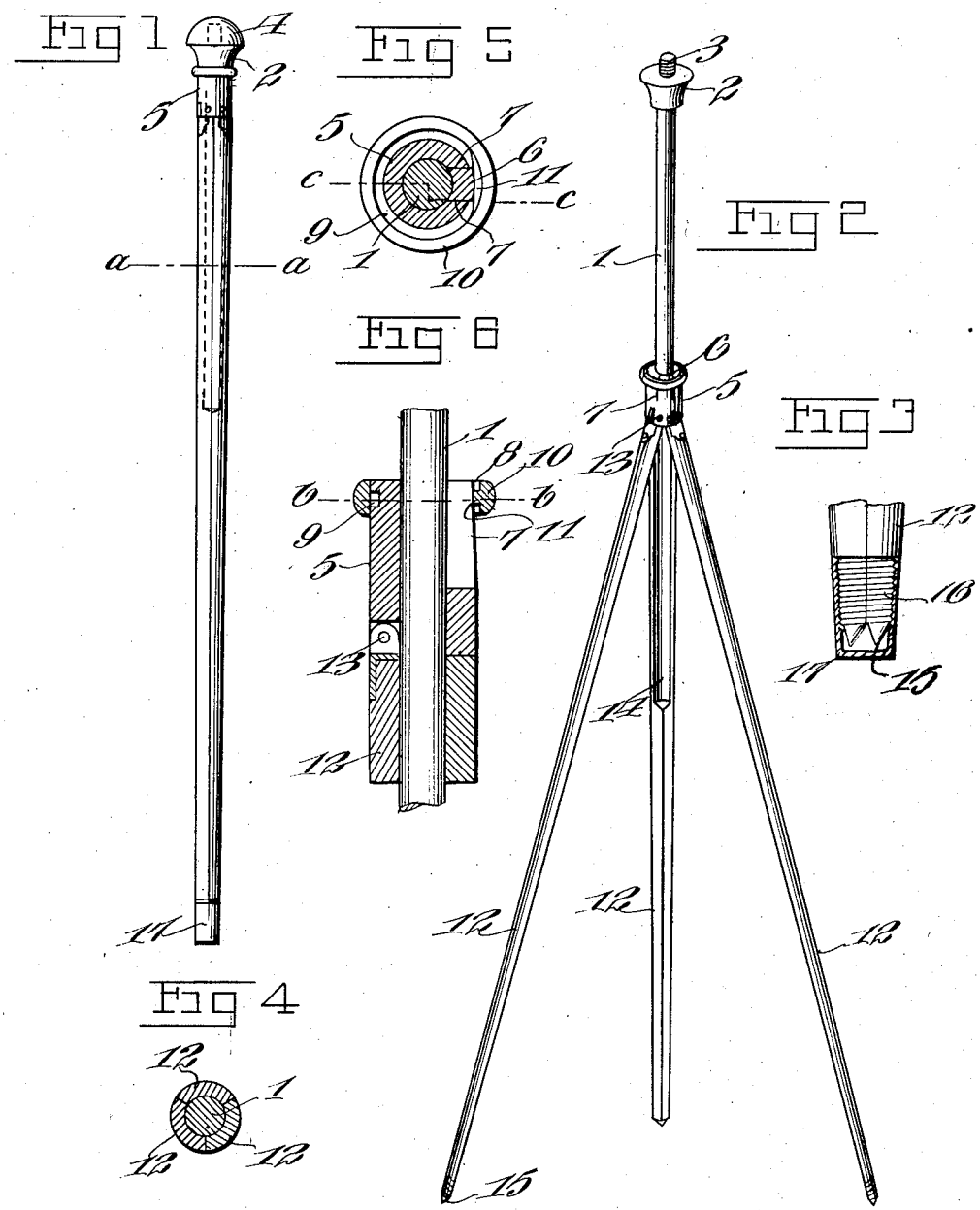

ISAAC A. BELL, OF CHICAGO, ILLINOIS.

CONVERTIBLE TRIPOD AND WALKING-STICK.

1,063,106.  Specification of Letters Patent.  Patented May 27, 1913.

Application filed February 17, 1912. Serial No. 678,247.

*To all whom it may concern:*

Be it known that I, ISAAC A. BELL, a citizen of the United States, residing at Chicago, in the county of Cook and State of Illinois, have invented new and useful Improvements in Convertible Tripods and Walking-Sticks, of which the following is a specification.

This invention is an improved convertible tripod and walking stick, adapted for use either as a cane or as a tripod for supporting a camera or other instrument, the object of the invention being to provide an improved device of this character which is extremely light, cheap and simple, and which is adapted to be almost instantly arranged for use either as a cane or walking stick or as a tripod.

The invention consists in the construction, combination and arrangement of devices hereinafter described and claimed.

In the accompanying drawing: Figure 1 is a side elevation of my improved convertible tripod and walking stick, showing the same arranged for use as a walking stick or cane. Fig. 2 is a perspective view of the same arranged for use as a tripod for supporting a camera. Fig. 3 is a detail elevation of the lower portion of the device, with the ferrule which secures the tripod legs together shown in section. Fig. 4 is a detail transverse sectional view on the plane indicated by the line $a$—$a$ of Fig. 1 and on a larger scale. Fig. 5 is partly a plan and partly a horizontal sectional view on the plane indicated by the line $b$—$b$ of Fig. 6. Fig. 6 is a detail sectional view on the plane indicated by the line $c$—$c$ of Fig. 5.

In accordance with my invention, I provide a member which I term a post and which is indicated at 1. This member is provided at its upper end with a head 2 at the center of which is an upstanding screw stud 3 which is adapted to secure a camera or other instrument on the head, and, hence, to the upper end of the post. I also provide a cap or knob 4 to cover the head when the device is in use as a walking stick, the said cap or knob being secured detachably to the head by means of the screw stud, the latter coacting with a threaded opening in the cap or knob. This post 1 is cylindrical and is of suitable length.

In connection with the post, I provide a sleeve 5 which is cylindrical in form, may be made of any suitable material and is formed at its upper end with an integral clamping tongue 6, the latter having its sides divided from the upper portion of the sleeve by means of substantially radial kerfs 7. The said tongue is flattened on its outer side near its upper end as at 8 and the sleeve is provided with an annular groove 9 which extends around the same from one side of the tongue to the other. A clamping ring 10 is arranged on the upper end of the sleeve and is formed on its inner side with a cam web 11 which may be caused, by partially turning the clamping ring to engage the groove 9 or to engage the flattened outer side of the tongue. When the clamping ring is turned so as to cause this cam web to engage the outer side of the tongue, the latter is pressed inwardly and caused to frictionally engage the post 1 so as to lock the same to the sleeve at any desired adjusted position, as will be understood. When the clamping ring is turned so as to move its cam web from engagement with the spring tongue, the latter by its own elasticity disengages the post and, hence, the sleeve is then free to be adjusted on the post or the latter to be adjusted in the sleeve, as will be understood.

The tripod legs 12 taper toward their lower ends and are of concavo-convex segmental form cross sectionally, as indicated in Fig. 4. These tripod legs have their upper ends pivotally connected to the lower end of the sleeve, as shown at 13. The tripod legs may be folded together so as to compactly dispose the same when the device is to be used as a cane or walking stick, and the upper portions of the tripod legs are concaved on their inner sides, as indicated at 14 so that they are adapted to receive that portion of the post 1 which is below the sleeve 5 between them, as shown in Fig. 4. Each tripod leg is provided with a point 15 at its lower end and a common screw thread 16 is formed on the outer sides of all three of the tripod legs at their lower ends so as to adapt the ferrule 17 to be screwed to the lower ends of the tripod legs when the latter are folded and the device is to be used as a walking stick.

It will be understood from the foregoing description and by reference to the drawings that when the device is for use as a walking stick, the cap or knob 4 is employed, the post 1 is moved downwardly in the sleeve 5 so as to bear on the upper end thereof, the said sleeve is clamped to the post and the tripod legs have their lower ends secured together by the ferrule ends 17. When the device is used as a tripod, the cap or knob 4 is removed, the ferrule 17 is also removed so as to release the tripod legs, the latter are appropriately arranged and the post 1 is secured at any desired vertical adjustment, this being indicated in Fig. 2.

While I have herein shown and described a preferred form of my invention, I would have it understood that changes may be made in the form, proportion and construction of the several parts, without departing from the spirit of my invention and within the scope of the appended claim.

I claim:—

The herein described convertible tripod and walking stick, comprising a post, a sleeve through which the post extends and in which the post is slidable, the said sleeve being provided at its upper end with a pair of spaced slits whereby an integral clamping tongue is formed between the slits, the said tongue forming a part of one side of the sleeve and being flattened on its outer side and the sleeve being provided with an annular groove which extends around the same from one side of the tongue to the other, a clamping ring arranged on the upper end of the sleeve and provided on its inner side with a cam web which may be caused by partly turning the clamping ring to engage the groove or to engage the flattened outer side of the tongue, and tripod legs pivotally connected to the sleeve.

In testimony whereof I affix my signature in presence of two witnesses.

ISAAC A. BELL.

Witnesses:
V. H. Way,
Chas. S. Macfenan.